Figure 1:
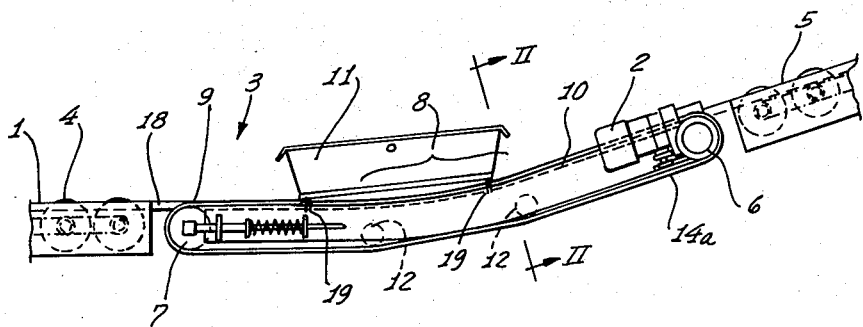

United States Patent
Lingg et al.

[15] 3,705,001
[45] Dec. 5, 1972

[54] TRANSITION RAMP FOR HIGH SPEED ROLLER TRACK CONVEYORS

[72] Inventors: Gerhard Lingg, Leimen; Alfred Hirth, Lampertheim, both of Germany

[73] Assignee: Mounesmann Aktiengesellschaft, Dusseldorf, Germany

[22] Filed: Aug. 9, 1971

[21] Appl. No.: 170,051

[30] Foreign Application Priority Data

Feb. 17, 1971    Germany.................P 21 07 491.9

[52] U.S. Cl...................................198/20, 198/131
[51] Int. Cl................................................B65g 47/22
[58] Field of Search.....198/20, 28, 85, 105, 184, 131

[56] References Cited

UNITED STATES PATENTS 3,182,782    5/1965    Beiler..................................198/28 X Primary Examiner—Edward A. Sroka
Attorney—Smyth, Roston & Pavitt

[57] ABSTRACT

Construction of a lower landing and transition ramp for a high speed roller track conveyor having horizontal and inclined flights and being used for baggage handling in airport terminals or the like. The conveyor moves pallets or the like, each having a pair of sled runners. The transition ramp has a pair of endless conveyor belts, each having a first straight, horizontal track portion, defining the lower landing, a straight inclined portion in line with said inclined flight, and a concave control portion as transition between the two straight portions, whereby the two straight portions each having approximately the length of one of the pallets. Additionally, there are guide rolls on the pallet for maintaining the runners thereof respectively on the belts, and there are bars over which the upper portion of the belts slide, for load support proper.

4 Claims, 2 Drawing Figures

PATENTED DEC 5 1972 3,705,001

INVENTORS:
Gerhard Lingg
Alfred Hirth

ATTORNEYS

TRANSITION RAMP FOR HIGH SPEED ROLLER TRACK CONVEYORS

The present invention relates to improvements of high speed conveyor facilities of the roller track variety, particularly as used for baggage handling in airport terminal check-in facilities. It is particularly assumed that the conveyor has an inclined ramp like portion or flight and requires transition to the horizontal. The horizontal portion of the conveyor facility from which the inclined portion turns up, can also be called the lower landing. The inclined portion may begin or end at the lower landing, the direction of transportation is immaterial for the invention, i.e., the conveyor facility may provide transportation up the inclined flight or down. Furthermore, it is presumed that the conveyor facility is to move so-called pallets, i.e., flat, trough like containers into which individual pieces of luggage are being placed. These pallets are presumed to have sled runners on their bottom.

It is apparent that a high speed conveyor should move these pallets with as little noise as possible and without undue shaking (and shaking of their content). However, it was found that the rather wide and straight runners of the pallets provide particular difficulties in such ramp portions of the conveyor track, as in the transition from horizontal to inclined level. The runners stumble from roller to roller, unless the rollers are spaced very close, and provided further that in the transition the track curves are upwardly *very* gradually, at a very large radius of curvature. Obviously, the more rollers are installed, the higher is the construction cost. Moreover, a large stretch needed for such transition may increase the total length of the conveyor facility or lead to other, awkward situations for the construction, and still, both measures are little more than a compromise.

It is an object of the present invention to provide a transition ramp with lower landing in a high speed roller track conveyor which can be traversed by pallets at low noise level and without more than usual shaking. The construction is to be simplified so that the transition between horizontal and inclined conveyor track portion requires only small radius of concavity for the upwardly curving incline. In accordance with the present invention, two runner tracks are provided in endless belt fashion, with slideably supported belts on stationary support rails, each belt having a straight horizontal and a straight inclined portion with a concave transition in between, whereby the two straight portions have length at least for about the length of a pallet. It is further presumed that the pallets are provided with guide means, such as rolls that run in a separate rail track for steering the pallet and keeping it laterally in desired position as well as preventing tilting off the conveyor. Particularly in the upwardly curving concave portion of the transition ramp, hold-down means are provided for holding the belts down, and forcing them to follow the desired track contour. Profile ridges are provided on the belts for carrying the runners of the pallets, the ridges are to extend higher than the upper side of the hold-down means.

Figure 2:
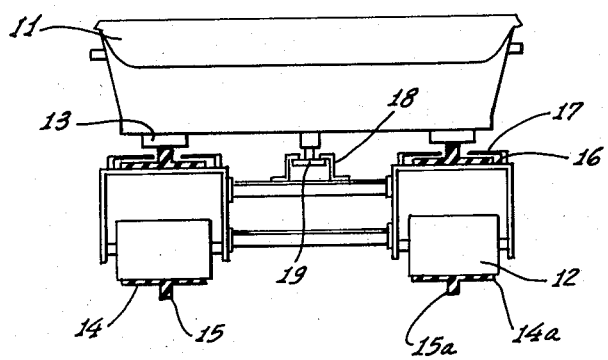

While the specification concludes with claims particularly pointing out and distinctly claiming the subject matter which is regarded as the invention, it is believed that the invention, the objects and features of the invention and further objects, features and advantages thereof will be better understood from the following description taken in connection with the accompanying drawings in which:

FIG. 1 is a side view of a horizontal-to-inclined track portion in a high speed conveyor improved in accordance with the preferred embodiment of the invention; and FIG. 2 is a section view along lines II—II of FIG. 1.

Proceeding now to the detailed description of the drawings, there is illustrated a high speed roller track conveyor having a horizontal track portion or flight 1 constructed of plural rollers such as 4. Another flight of the conveyor facility is inclined and includes rollers such as 5. A transition track 3 or ramp with landing is disposed in between.

The direction of motion could be from left to right or from right to left which is unimportant per se. Also, it should be noted that the invention is independent from the length of tracks 1 and 5. Therefore, for all practical purposes, only one or two of the rolls such as 4 of the horizontal flight portion may be provided, and that may be the end or the beginning of the conveyor in the horizontal, as lowest level in this particular instance. In order to facilitate description, it is presumed that the conveyor moves pallets 11 from left to right.

The transition track 3, or ramp with landing, includes two endless belts, 14 and 14a, with drive pulleys 6 and reversing pulleys 7. The upper portions of the respective belts provide the track proper as moving transport facility. Considering a belt as coming, for example, from the reversing pulleys 7, each belt runs first through a straight, horizontal portion for about the length of a pallet such as 11; this track portion is the lower landing. The lower landing is followed by an upwardly curving concave track portion 8 which provides the transition proper towards the incline, which is continued as straight portion for the belts until reaching the drive pulleys 6. The radius of curvature is of concave track portion 8 and is quite small, only about the length of one pallet. Therefore, the inclination is actually entered into with quite small transition proper.

The incline is continued by rollers 5, while the belts themselves run on the underside along a polygon-like path, established by guide pulleys such as 21; the polygon portion ends at the reversing pulley 7 completing the closed loop of each belt.

The belts are provided with a central, outwardly extending ridge 15 and 15a respectively (see FIG. 2). The pallets 11 each have sled runners 13, and these runners sit on the ridges when the pallet traverses this transition ramp 3. The inwardly directed surface of the two belts 14 and 14a is plane, and along the upper track portion the belts are slideable supported on sheets or flat bars 16 extending over the entire length of the transition ramp 3, and defining the contour of the conveyor path therein.

Hold-down means 17 are provided, particularly in the concave, central portion of the belts, gripping around the belts and forcing them to follow the concave contour. It should be noted that without these hold-down bars or rails 17, the belts as traversing the upper track portion, would extend in a straight line from pulley 7 to pulley 6 at an angle about half that of the incline. However, the hold-down means (griparound bars or rails 17) together with the support sheets 16 enforces the illustrated contour for the load carrying track portion of the belts, particularly the concave portion 8. The ridges 15 up between opposite hold-down rails extend higher than the upper surface of these hold-down rails 17, so that the pallets clear them.

The entire transition ramp 3 includes a centrally disposed guide rail means 18 defining vertically oriented track surfaces and having two rails of inverse L-shaped contour. Each pallet has front and aft rolls 19 that ride in the guide rail. The overhung portions of the rail means define a gap, and the axles of the rolls or wheels 19 extend therethrough. That gap is, however, sufficiently narrow so as to prevent the pallets from lifting off the tracks. This way, the pallets will neither tilt nor escape laterally. As guide rolls or wheels 19 are located on the ends of the pallets only, they assume always position in the guide rails 18 as shown in FIG. 2 and will not impede the upward curving of the run.

Assuming that the direction of motion is from left to right, it can readily be seen that a pallet enters the ramp at the lower landing portion of the transition ramp and will remain horizontal until entirely supported by the two belts. As the front portions of the runners move onto the concave portion, there is a gradual change of support of the pallet by the belts at the two ends of the runners only. As the pallet enters the incline, there is again a gradual transition to full support over the entire length of the runners, until the rear end of the runners has completely traversed the curvature of the curved portion 8, whereupon the pallet runners sit again flat on the ridges of the conveyor belts and move up the incline portions thereof.

The entire change in support during this transition occurs gradually and without shocks. The pallet enters the transition ramp with no shock noise, nor is there shaking. The inclination of the pallet is changed gradually, and it will leave the transition ramp for the inclined flight 5, also without shock. The operation will, of course, be analogous and noiseless, if the ramp provides for transition from a downward moving conveyor flight to a horizontal flight at a lower level.

The invention is not limited to the embodiments described above but all changes and modifications thereof not constituting departures from the spirit and scope of the invention are intended to be included.

We claim:

1. Construction of a lower landing and transition ramp for a high speed roller track conveyor having horizontal and inclined flights or track portions, for baggage handling in airport terminals or the like, the conveyor to be used for moving pallets or the like, each having a pair of sled runners, comprising:

a pair of endless conveyor belts each having a first straight, horizontal track portion, defining the lower landing, a straight, inclined portion in line with said inclined flight, and a upwardly curving concave portion as transition between the two straight portions;

the two straight track portions of each belt having approximately the length of one of the pallets;

means, including guide rolls on the pallet for maintaining the respective runners thereof on the belts when traversing this transition flight; and means disposed for providing stationary support for the upper track portion of each belt that includes respectively the straight horizontal, straight inclined and upwardly curving portions. sized avoid a pH of low solubility.

2. Construction as in claim 1, including means for providing for a gradual concave transition of the respective upper belt track between horizontal and inclined portions.

3. Construction as in claim 1, the belts each provided with a central ridge for respective support of the runners.

4. Construction as in claim 3, there being hold-down means for guiding the belts in the transition between horizontal and inclined portions, the ridges extending higher than the hold-down means.

* * * * *

UNITED STATES PATENT OFFICE
CERTIFICATE OF CORRECTION

Patent No. 3,705,001            Dated December 5, 1972

Inventor(s) Gerhard Lingg, et al.

It is certified that error appears in the above-identified patent and that said Letters Patent are hereby corrected as shown below:

On the cover sheet item [73] "Mounesmann Aktiengesellschaft" should read -- Mannesmann Aktiengesellschaft --.

Signed and sealed this 26th day of February 1974.

(SEAL)
Attest:

EDWARD M. FLETCHER, JR.
Attesting Officer

C. MARSHALL DANN
Commissioner of Patents